July 7, 1970            D. E. KRUP            3,519,707
METHOD OF MAKING ELECTRICAL CONNECTORS
Filed May 9, 1968                              3 Sheets-Sheet 1
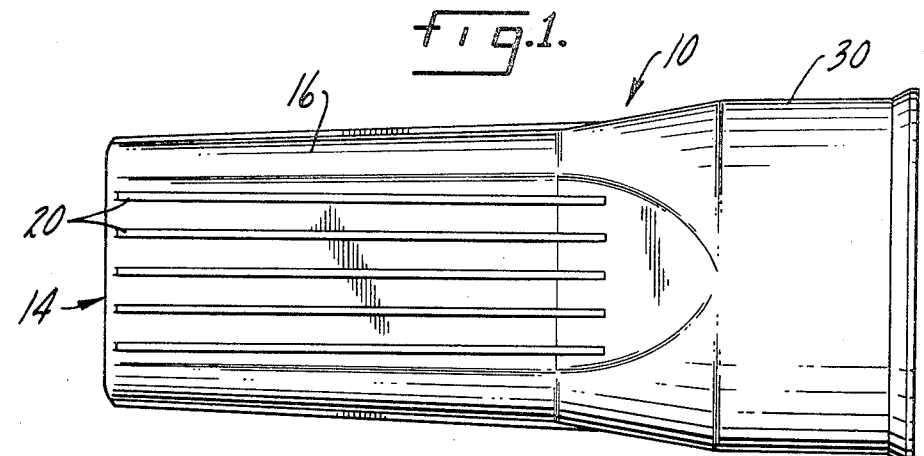
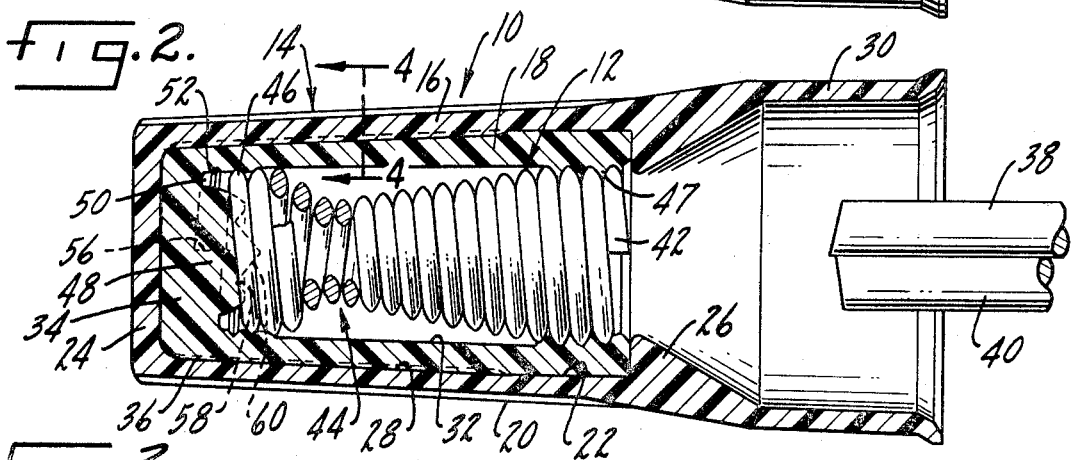
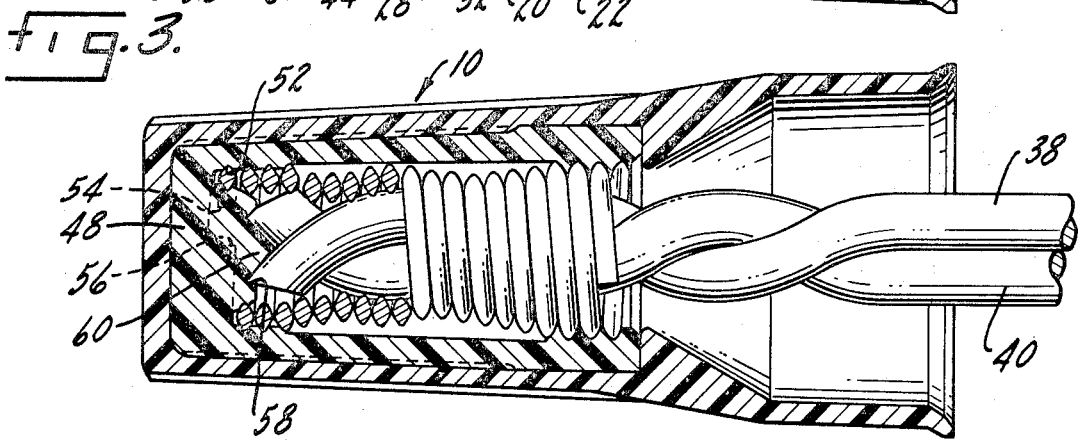
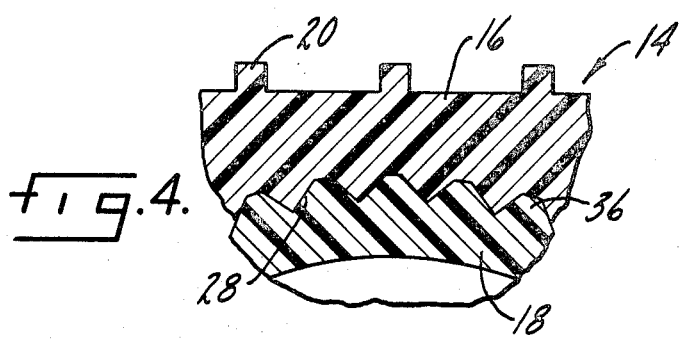
INVENTOR.
Donald E. Krup,
BY Parker & Carter
Attorneys.

July 7, 1970  D. E. KRUP  3,519,707
METHOD OF MAKING ELECTRICAL CONNECTORS
Filed May 9, 1968  3 Sheets-Sheet 2
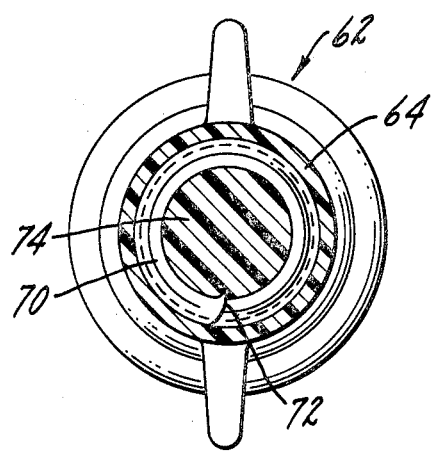
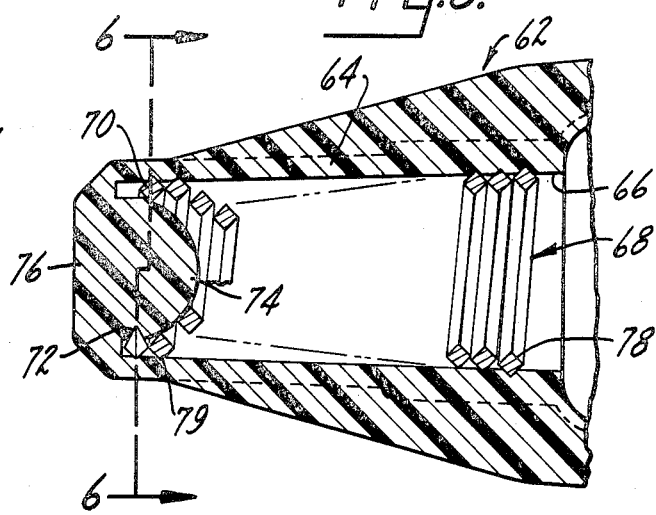
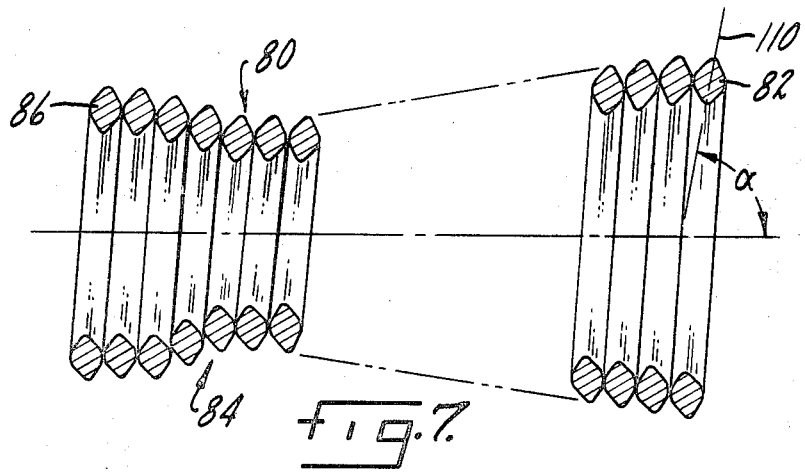
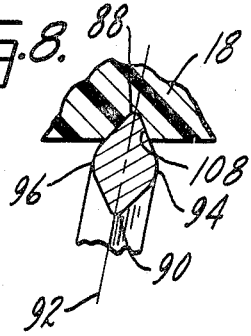
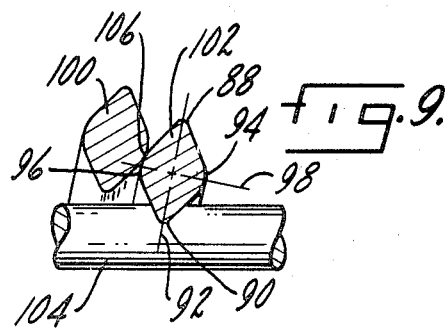
INVENTOR.
Donald E. Krup,
BY Parker & Carter
Attorneys.

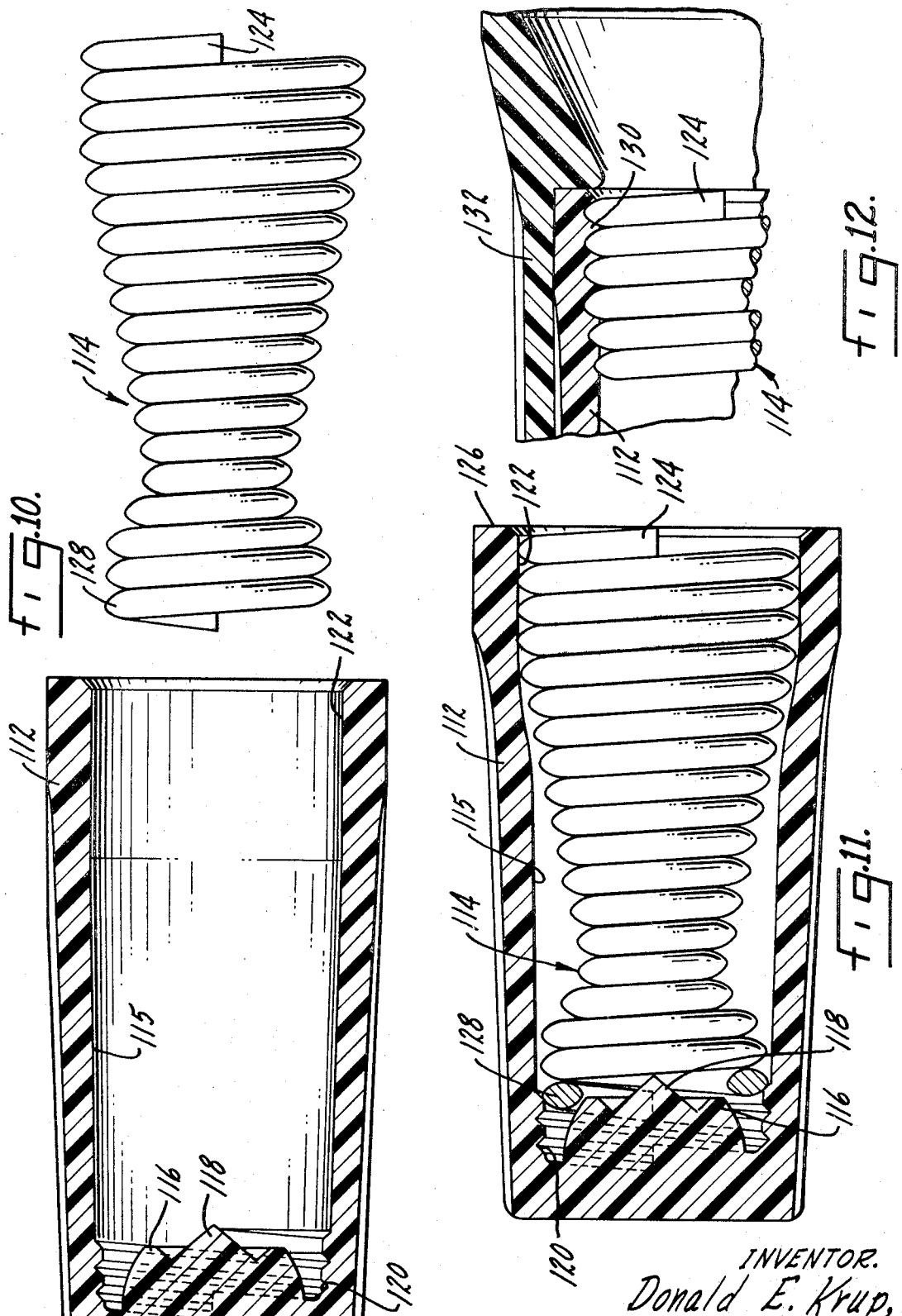

United States Patent Office 3,519,707
Patented July 7, 1970

3,519,707
METHOD OF MAKING ELECTRICAL CONNECTORS
Donald E. Krup, Elgin, Ill., assignor to Ideal Industries, Inc., Sycamore, Ill., a corporation of Delaware
Filed May 9, 1968, Ser. No. 727,841
Int. Cl. H02g 15/08; B29c 19/00
U.S. Cl. 264—249            6 Claims

ABSTRACT OF THE DISCLOSURE

The method and apparatus for connecting together a plurality of wire ends. A helical spring is driven on the wires through the wedging action of a connector body projection. A depression on the projection and a cone within the depression provide improved features. The helical spring is formed with an improved diamond-shaped cross section having its radial axis inclined inwardly, and the sides of the spring turns cooperate together to prevent telescoping action. The spring is formed with a long taper for maximum wire engagement, and the outer margin of the spring is in threadable engagement with the body. A modified spring has a tang on its inner end which embeds in the projection to provide driving torque. The body cavity is formed with threads for guiding this spring onto the projection, and these threads and shallow to permit stripping of the body from the mold pin. Internal body threads at the open end are formed by induction heating after the spring is inserted within the cavity.

SUMMARY OF THE INVENTION

This invention relates generally to wire connectors and more particularly relates to the method and apparatus for rapidly forming a secure connection between wire ends with a screw-on type connector device.

It is an object of this invention to provide the method and apparatus for connecting wire ends with a screw-on connector having a helical spring which is wedged in driving engagement within a cavity in the connector.

Another object is to provide a wire connector having a cavity provided with a wedging projection and shallow threads which cooperate to drivingly engage the proximal turns of a helical spring.

Another important object is to provide a wire connector having a wedging projection within a cavity and a depression on the projection to accommodate misalignment of the wire ends so that maximum spring contact is made with the wires.

Another object is to provide a wire connector having a wedging projection within a cavity, and a depression in the cavity, in which guide means are provided in the depression to deflect the wire ends outwardly to prevent wire penetration of the connector end wall.

An important object is to provide a wire connector having a helical spring positioned within the connector cavity in which the inner turn of the spring is formed with a tang adapted to extend into interference relationship with the connector end wall to transmit torque between the body and spring.

Another object is to provide a method of making a wire connector in which a helical spring with a tang on one end is inserted in the cavity of a connector body with the tang end positioned adjacent a projection on the body end wall so that driving engagement of the tang into the projection may be completed when the wire connection is made.

Still another object is to provide the method of forming a wire connector in which a helical spring is formed with a tang and inserted into a cavity of a connector body having an end wall wedging projection, with the spring initially positioned adjacent the projection so that final wedging engagement of the spring end and tang is completed as the wire connection is made.

Another important object is to provide a helical spring for a wire connector in which the spring is formed defining a long taper from its distal end to a narrowed throat section at its proximal end, with both ends threadably engaging internal threads provided on the cavity of the connector.

Another object is to provide a helical spring for a wire connector in which spring turns are formed with a generally diamond-shaped axial cross section, and with adjacent spring edges cooperating to resist axial thrust and prevent telescoping action.

Another object is to provide a helical spring for a wire connector in which the axial cross sectional shape of the spring has a radial axis inclined inwardly towards the proximal spring end to provide resistance to pull-out of the wires from the connector.

Another object is to provide a method of making a wire connector in which a helical spring is inserted into the cavity of a connector body of thermosetting material so that the open end of the body is stretched over the end turns of the spring, and in which the material is heated to form threads around the spring.

Another object is to provide a method of forming a wire connector having a wedging projection within a cavity of the connector body in which shallow threads for guiding a spring onto the projection are formed in the cavity so that the body may be stripped from a mold pin without rotation.

Another object is to provide a method of forming a wire connector in which a helical spring is inserted without rotation into the body cavity with the spring distal end positioned flush with the open end of the cavity, and in which internal threads are then formed on the body around the distal end without forming a shoulder which would otherwise prevent removal of the spring.

These and other objects of the invention will become apparent to those skilled in the art when the following specification is read in conjunction with the accompanying drawings.

DESCRIPTION OF THE DRAWINGS

FIG. 1 is a side view of a connector assembly embodying features of the invention;

FIG. 2 is an axial section of the wire connector of the invention prior to making a wire connection;

FIG. 3 is an axial section of the wire connector after a connection of two wires has been made;

FIG. 4 is a partial sectional view taken along the line 4—4 of FIG. 2;

FIG. 5 is an axial section of a modified wire connector according to the invention;

FIG. 6 is a sectional view taken along the line 6—6 of FIG. 5;

FIG. 7 is an axial section of a helical spring element of the invention;

FIG. 8 is a partial sectional view illustrating threading engagement of the spring with the connector body;

FIG. 9 is a partial sectional view illustrating engagement of the spring with a wire;

FIG. 10 illustrates the spring and an axial section of the connector cage prior to assembly thereof;

FIG. 11 is an axial section of the cage showing another step in the assembly with the spring; and, FIG. 12 is a partial axial section of a shell and the cage of FIG. 11 after complete assembly.

DETAILED DESCRIPTION

Referring now to the drawings and particularly FIGS. 1 and 2 a preferred embodiment of the invention is illustrated generally at 10. Connector 10 is a screw-on type device adapted to rapidly and securely join the ends of wires, such as the stripped end of electrical conductors, guy wires or control wires, and the like. Any combination of wire sizes or different types of wires may be joined by connector 10. The resulting connection will firmly grip the wire ends and, in the case of electrical conductors, insure good electrical contact without the need of solder.

The connector illustrated in FIGS. 1 through 4 is of a three-piece construction in which a spring element 12 is retained within a body structure 14 comprising an outer shell or cap 16 and an inner cylindrical insert or cage 18. It is understood that features of the invention will also have application with a connector comprising a two-piece construction, as will hereinafter be described.

Shell 16 serves to insulate and protect the connector and resulting wire connection. The shell may be formed with rounded or angular side surfaces and may be provided with longitudinal ribs or fluting 20 to provide a suitable gripping surface. An open-ended cavity 22 is defined by the side surfaces, an end wall 24, and angular shoulder 26 which defines the cavity opening. The inner surface of the cavity is formed with a series of longitudinal grooves 28, or other suitable locking structure, as illustrated in FIG. 4. Preferably an axially extending skirt 30, which may be of cylindrical construction, extends from the open end of body 14 to serve as a dielectric shield and protective covering for the wire connection. Shell 16 is preferably formed from a flexible dielectric material. Vinyl is a suitable material but it is understood that other equivalent materials may be utilized.

The insert or cage 18 comprises a generally cylindrical body defining an open-ended cavity 32 closed at one end by end wall 34. Cage 18 is tightly fitted within shell cavity 22 and is formed with a plurality of splines 36 interfitting in locking engagement with shell grooves 28. The cage may be retained within the shell by suitable means such as shoulder 26 which is adapted to flex outwardly to permit insertion of the cage into the shell cavity.

Spring 12 comprises a generally helical coil formed from a suitable material such as spring-steel. The spring is of the "free-spring" type adapted to screw on the cluster of wires, such as 38 and 40, and grip the wires in a tight connection. The spring is formed to taper gradually from one or more expanded turns at the front or distal end 42 to a narrowed throat section 44. The expanded turns at the distal end threadably engage interior threads 47 formed on cage 18 to lock the spring and resulting wire connection against axial displacement from the connector. One or more expanded turns are formed at the rear or proximal end 46 for wedging engagement with the cage, as will hereinafter be described.

The wire connection is made by screwing connector 10 in a clock-wise direction, as viewed from shell end 24, onto two or more wires positioned side-by-side, as illustrated in FIG. 2. The wires will advance through the spring and twist together in the manner shown in FIG. 3. The spring turns at throat section 44 will resiliently expand outwardly to compressibly grip the wires. As this occurs, the effective length of the spring will shorten, resulting in the turns at distal end 42 retreating along cage threads 47. It is desirable that sufficient threading engagement between the spring and cage be provided so that adequate holding force is achieved even after the spring is shortened in this manner.

Cage 18 is preferably fabricated from a material having high strength and sufficient rigidity to drive the spring onto the cluster of wires and hold the connector on the resulting wire connection. Nylon or any suitable semi-rigid or rigid thermoplastic and/or thermosetting plastic or resin may be used.

Spring 12 is driven onto the wires by torque transmitted from cage 18 through a wedging engagement of the proximal turns of the spring with the cage end. A projection or knob 48 is preferably formed integral with cage end wall 34 and extends forwardly into cavity 32. The projection is formed in a semi-spherical shape to cam or wedge the spring turns outwardly into zone 50 which diminishes axially towards the end wall. Shallow thread detail 52 on the cage functions as a guide to direct the spring into zone 50. When the spring is initially assembled into cage 18, the spring turns at 46 may engage only a portion of thread detail 52 so that subsequent turning of the spring relative to the cage will lead the spring into the remaining threads. Also, it is contemplated that initial assembly will produce only a partial wedging effect, depending on the effective length of the spring and the force with which it is inserted into the cage. The unit as sold to the customer would thus appear as shown in FIG. 2. When the customer makes the wire connection final assembly will, in effect, be completed in that the wedging action will be completed.

A completed wire connection is illustrated in FIG. 3. The resilient compressive force between projection 48 and threads 52 tightly grips the spring end 54 in the position shown. The wedging action thus transmits driving torque to the spring for making the connection. As a result, it is not necessary to provide an abutment or other spring engaging device for driving the spring. The end of the thread detail at 56 does not function to abut against the spring.

An annular concave depression 58 is formed in projection 48 and aligned along the cage axis. The depression functions to receive the wire ends to insure that maximum contact of the spring turns with the wire cluster is made. For example, where one of the wires in the cluster leads, or overlaps, in an axial direction with the other wire depression 58 will permit the leading wire to advance sufficiently through the throat section so that gripping contact is made with the remaining wire or wires. This feature eliminates the need to provide a longer cage and spring to achieve the same result. Also, the length of spring taper need not be as long as would otherwise be required so that the change in diameter of the expanded turns at 46 need not be abrupt. An abrupt change in diameter of these turns would increase the possibility of telescoping the spring during wire insertion.

A projection or cam 60, preferably formed integral with projection 48, extends outwardly into the cavity along the cage axis from depression 58. Cone 60 functions to guide or deflect outwardly the sharp ends of wires 38 and 40 as they advance against cage end wall 34. Without cone 60, the wire ends may penetrate through the end wall if one wire overlaps another too much, or if too much driving torque is applied as the connection is made.

Referring to FIGS. 5 and 6 a two-piece wire connector is illustrated generally at 62. Connector 62 comprises a body structure or shell 64 having an open-ended cavity 66 containing a helical spring 68. The rear or distal end 70 of the spring is formed with a sharp tang 72. The tang may be formed by the coil forming machine during the cut-off operation, or by a separate operation. Tang 72 is adapted to project inwardly in interference relationship with a projection 74 formed on end wall 76 of the body. As spring 68 is turned into body cavity 66 tang 72 will cut into or gouge projection 74. The resistance of the projection against the tang will transmit driving torque to the spring for making the wire connection. At the same time, with the tang imbedded in projection 74, added resistance to pull-out of the wires and spring from body 64 is provided. It is also contemplated that the tang feature may be used in combination with a wedging-type projection as described hereinbefore, so that both types of holding and driving action are produced. Moreover, the tang feature may be used with either a threadable connection between the spring distal end 78 and corresponding internal threads 79 in the cavity, or else in a connector without such threads.

In use, connector 62 may either be factory-assembled so that tang 72 is imbedded in projection 74 by an axial push, or else the spring may be turned only to abut projection 74 and engage with one or more of the internal threads 79. In the latter instance, the tang will be completely imbedded into driving relationship by the user when the wire connection is made.

FIG. 7 illustrates a helical coil or spring 80 of the type used with either the two-piece or three-piece connectors 10 and 62. Spring 80 tapers gradually from one expanded turn 82 at its distal end to a narrowed throat at 84, and with expanded turns 86 at the proximal end for suitable driving engagement with the body structure.

The spring is formed with each turn having a generally diamond-shaped axial cross section configuration. As illustrated in FIG. 8, the opposing edges 88 and 90 along the generally radial diagonal 92 of each turn are formed into pointed or thread-like shapes. As shown in FIG. 9, the opposing edges 94 and 96 along the generally axial diagonal 98 are generally rounded, or have relatively larger radii than the edges 88 and 90. Edges 94 and 96 thus define flats or surfaces to resist axial thrust between adjacent spring turns, such as turns 100 and 102 of FIG. 9. This functions to prevent telescoping action or the tendency of one turn to ride under or over an adjacent turn. Thus, in FIG. 9 an axial thrust from wire 104, such as would occur when a cluster of wires is forced into the connector, is uniformly transferred from turn to turn at the interface 106 between adjacent edges.

The inner turn edge 90 is formed into a thread-like configuration to assist in screwing onto conductor wire 104. Outer edge 88 is formed into a thread to engage corresponding threads of the cage or body structure. With coil 80 having a long taper, it is essential that the thread connection between the spring and cage provide adequate strength to resist wire pull out from the connector. Moreover, as the effective length of the spring shortens due to throat expansion, retreat of turn 82 will function to form a new thread in the cage or body, as at 108 in FIG. 8. This thread shape of the external margin of the spring provides greater holding power to retain the spring within the cage, as compared to springs having a rounded outside margin.

Another feature of the invention is illustrated in FIG. 7 in which the spring turns are formed with each turn cross sectional configuration having its axis 110 inclined inwardly towards the spring proximal end and making an acute angle $\alpha$ with the spring longitudinal axis. This provides resistance to axial thrust of the wire ends relative to the spring and thus greatly increases the ability of the connector to resist wire pull out force. The novel configuration creates a self-locking action opposing such pull out force as a result of the resistance to twisting of the turns as they tend to rotate to a position normal to the spring axis.

FIGS. 10 through 12 illustrate an improved method of making a wire connector of the type described. Applicant's invention provides a simplified method employing a minimum number of steps to form and assemble the component elements of the connector. The invention has application in making a connector of either the two-piece or three-piece type, or other screw-on connectors in which spring elements are inserted within a body structure. In FIG. 10 elements of a three-piece connector are illustrated in which a cage 112 and spring 114 are shown in position prior to assembly.

Cage 112 is formed of a suitable thermoplastic material, such as nylon, in a mold cavity having a mold pin, not shown, relieved in a conventional manner to define cavity 115, wedging projection 116, cone 118 and thread detail 120. The material is injected into the cavity and cooled in a conventional manner to set, and the female mold part, not shown, is then retracted from the surface of cage 112. Engagement of the cage threads 120 with the mold pin provide sufficient resistance to prevent the cage from pulling off during this operation. However, the threads 120 are formed with a relatively shallow depth so that the completed cage may be stripped from the pin through a straight axial thrust of a stripping plate, or other suitable device. The stripping plate will pop the threads 120 from the mold 10 without the need to provide a separate operation to unscrew the cage. This stripping operation is assisted by the fact that no threads are formed on the internal surface at the open end 122 of the cage. Thus, there is no threading engagement between the cage and mold 10 at end 122 to resist the axial stripping motion. Moreover, it is possible to assemble spring 114 within cavity 115 in a simple straight pushing operation without the need to screw the spring into the cage.

As illustrated in FIG. 11, spring 114 is inserted into cage 112 so that spring distal end turn 124 is flush with cage shoulder 126. During this operation the proximal turn 128 abuts against wedging projection 116 and guiding threads 120 to a greater or lesser extent depending on the effective length of spring 114 relative to the depth of cavity 115. As the spring is inserted, cage end 122 will expand outwardly and compressively grip the spring. In the next step the cage and spring are moved to a heating means, such as within an electric induction heating coil, to heat the cage material in contact with the spring distal end. In the induction coil method the metal of the wire is inductively heated to in turn heat the adjacent cage material. The "plastic memory" of the cage material will cause the material to flow around the external surface of the spring. The unit is then cooled to set the cage material and form threads 130 of FIG. 12. These internal threads match perfectly with the external spring threads even if the spring is out of tolerance. The resulting threadable connection between the spring and cage provides very strong holding power to prevent the spring from being stripped from the cage. Moreover, since distal end 124 is flush with cage shoulder 126 during the induction heating, the cage material does not flow around the end of turn 124 and thus does not form a restraining shoulder which would otherwise make a desired removal of the spring difficult. The resulting cage and spring assembly may then be inserted within a protective shell 132 to form the completed connector.

The foregoing method for making the connector is simple in that both fabrication of the cage and insertion of the spring within the cage cavity may be performed in simple operations not involving rotary movement. Although it may be expedient to turn the spring within the cage so that a wedging action occurs, this is not necessary since this operation may, in effect, be finally performed by the user when the wire connection is made.

It will be understood that various changes in the details, material, steps and arrangement of parts, which have been described and illustrated in order to explain the nature of invention, may be made by those skilled in the art within the principle and scope of the invention.

I claim:

1. The method of making a connector for use in joining a plurality of wire ends comprising the steps of:
 (a) forming a connector body of plastic material having a cavity with an open end of a predetermined internal diameter, and an end wall;
 (b) inserting a helical spring into the cavity, the spring having an end with an external diameter greater than said predetermined diameter whereby the cavity open end is stretched over said spring end;
 (c) heating the body material adjacent the spring end to form the body material around the external surface of the spring end into internal threads; and,
 (d) cooling the body to set the material.

2. The method of claim 1 further characterized in that in step (c) the body material is heated by placing the connector and spring in an induction coil.

3. The method of claim 1 further characterized in that in step (a) the body comprises a cage adapted for insertion into an outer shell; and in step (b) the spring is inserted with the spring end flush with the open end of the cavity.

4. The method of claim 1 further characterized in that in step (a) the body cavity is formed with internal threads adjacent the end wall, and with means on the end wall to wedge the spring into engagement with the cavity threads; and in step (b) the spring is axially inserted into the cavity with its other end engaging at least one turn of the cavity thread whereby wedging engagement of the other spring end may be completed by making the wire end connection.

5. The method of claim 1 further characterized in that in step (a) the body cavity is formed with internal threads adjacent the end wall, and with a projection on the end wall to wedge the spring into engagement with the cavity threads; and in step (b) the spring is inserted without rotation into the cavity with its other end engaging the projection and partially wedging into the cavity threads, whereby the wedging may be completed by making the wire end connection.

6. The method of claim 1 further characterized in that in step (a) the body comprises a cage adapted for insertion in an outer shell, the cage being formed on a mold pin defining the cavity, with the threads being shallow in depth, and the cage is stripped directly from the pin without relative rotation therebetween.

References Cited

UNITED STATES PATENTS

| 2,825,750 | 3/1958 | Stockwell | 174—87 |
| 3,097,257 | 7/1963 | Cheney | 174—87 |
| 3,297,816 | 1/1967 | Waddington | 174—87 |
| 3,308,229 | 3/1967 | Burniston | 174—87 |
| 3,347,979 | 10/1967 | Hoffman | 174—87 |

FOREIGN PATENTS

| 654,131 | 11/1928 | France. |
| 657,405 | 9/1951 | Great Britain. |

DARRELL L. CLAY, Primary Examiner

U.S. Cl. X.R.

174—87; 29—628, 630